Patented Jan. 27, 1942

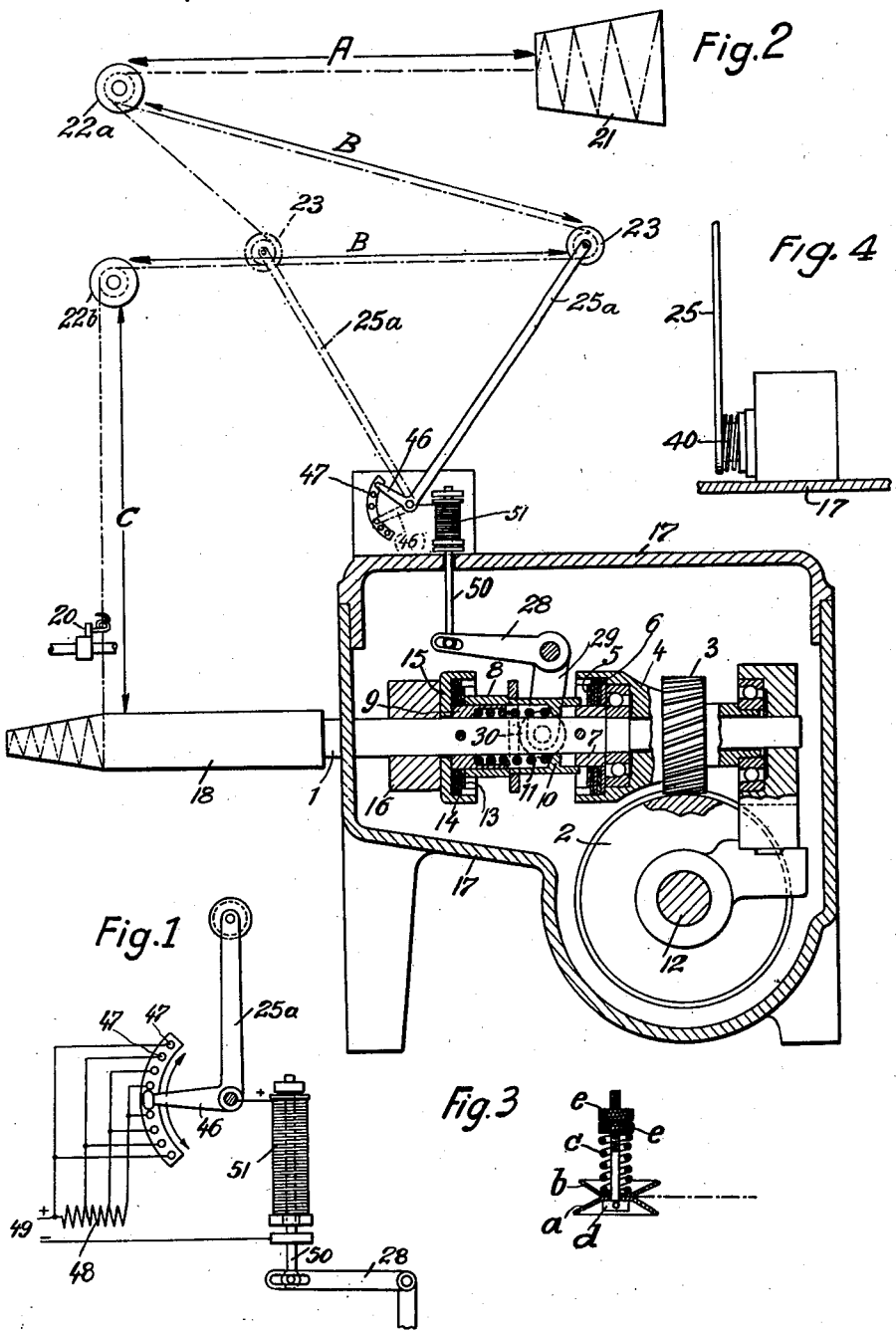

2,271,051

UNITED STATES PATENT OFFICE 2,271,051

WINDING FRAME

Hans Treckmann, Wuppertal-Oberbarmen, and Carl-Georg Rosenkranz, Wuppertal-Barmen, Germany, assignors to Messrs. Halstenbach & Co., Wuppertal-Wichlinghausen, Germany, a German partnership company Original application August 16, 1939, Serial No. 290,482. Divided and this application October 5, 1940, Serial No. 359,959. In Germany August 19, 1938

5 Claims. (Cl. 242—45)

This application is a division of our pending application Serial No. 290,482, filed August 16, 1939.

This invention relates to winding frames and has relation more particularly to a power transmitting device for winding a strand of yarn or the like upon a pirn.

It is an object of the invention to provide a mechanism having a driven element or winding spindle in driven connection with a driving member, said driven connection including a clutch element and which mechanism also has a braking element for the driven member or spindle together with means whereby both the clutching element and the braking element are controlled by the tension of a strand, such as yarn, through the medium of a common shifting element, such as a pendulating yarn feeler.

It is also an object of the invention to provide a mechanism of this kind including a clutch element and a braking element for a driven member or spindle under control of a common shifting element and wherein movement of the shifting element in one direction is under electromagnetic control.

The invention consists in the details of construction and in the combination and arrangement of the several parts of our improved winding frame whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein—

Figure 1 is a view partly in section and partly in elevation and of a diagrammatic character illustrating a power transmission mechanism constructed in accordance with an embodiment of the invention;

Figure 2 is a fragmentary diagrammatic view illustrating the yarn feeler and concomitant parts in positions other than illustrated in Figure 1;

Figure 3 is a detailed sectional view of a braking device;

Fig. 4 is a fragmentary view mainly in elevation illustrating essentially the tension device which assists in the control of the yarn feeler later to be referred to.

As illustrated in the accompanying drawing, the spindle 1 receives its motion from a gear 3 by way of a worm gear 2, the said gear being mounted firmly on a sleeve 4 which is supported at both ends by ball bearings. The tubular cavity in the one end of the sleeve 4 carries axially movable discs 5 co-operating with corresponding discs 6, which are connected so as to be axially shiftable to a collar 7 mounted on the spindle 1, and are acted upon by a shifting member 8, which is designed as a sleeve and is guided at the one end on the collar 7.

The opposite end of this shifting member 8 is supported in axially slidable fashion by a second collar 9, which is also mounted on the spindle 1. An inner rib 10 in the sleeve 8 is acted upon by a coil spring 11, which bears against the collar 9 and by reason of its shifting effect on the sleeve 8 has the tendency to maintain the discs 6 and 5 of the driving clutch in engagement with one another, so that in this case the driving force emanating from the worm wheel 2 on the shaft 12 is transmitted by way of the gear 3, the sleeve 4 and the discs 5 and 6 to the collar 7 firmly mounted on the spindle 1.

If the member 8 is moved in opposition to the spring 11, the clutch discs 5 and 6 are released from engagement and the drive ceases to act on the spindle 1. If the member 8 is moved still further, it enters into engagement with the discs 13 and 14, of which the former are mounted to be axially slidable on the collar 9, whilst the latter are arranged to slide axially in a fixed brake drum 15, which is firmly connected to the bearing 16 for the casing 17 of the gear box, which latter is mounted in the frame of the winding machine.

Fig. 2 shows on the spindle 1 a pirn 18, which is produced by guiding the yarn 19 in the conventional fashion by means of a traversing yarn guide 20. The yarn 19 comes from a supply bobbin 21, from which, in the embodiment according to Fig. 1, it is withdrawn endwise, i. e. axially, whereupon it passes through a braking device 22a, over the roller 23 of a feeler lever 25 pivotally mounted at 24 and to a second braking device 22b and thence through the eyelet of the traversing yarn guide 20. The two braking devices 22a and 22b consist in the conventional manner of two oppositely disposed plates a and b, which are subjected to a regulable pressure by means of a threaded bolt d, two adjustment nuts e, e and a coil spring c. They are so adapted to one another that the tension necessary for the winding of the yarn on the pirn 18 is imparted to the yarn by the braking device 22b, whilst the braking device 22a tensions the yarn proceeding from the bobbin 21 to the braking device 22b to a smaller extent.

With this disposal of the two braking devices 22a and 22b there are accordingly produced in the yarn between the bobbin 21 and the pirn 18 three tension ranges as follows: the tension range A along the path between the bobbin 21 and the braking device 22a, the tension range B, which extends from the braking device 22a over the roller 23 of the feeler lever 25 to the braking device 22b, and the tension range C, in which tension is applied to the yarn 19 by the braking device 22b before it is wound on the pirn 18.

As shown by Fig. 2, the yarn feeler lever 25 is disposed in the tension range B, in which the tension is less than in the range C, in which there prevails the working tension.

The feeler arm 25 acts by means of a lever arm 46 on electric contacts 47, which are connected to different resistance ranges of a resistance 48 in the electric circuit 49. The bell crank lever 28 of the shifting member 8 is pivoted to the core 50 of a coil 51 and is shifted therein, dependent on the resistance disconnected by the movement of the lever arm 46, to an extent corresponding to the degree of oscillation of the feeler 25. In Fig. 1 there is shown a zero position, and in Fig. 2 in dash-dotted lines, an extreme position which is brought about by maximum tension of the yarn. If there is no tension of the yarn acting on the feeler 25, the lever arm 46, under the action of a spring 40, is rocked in the opposite direction, which is indicated in Fig. 2 in full lines, and in this way there are disconnected successively the same resistance ranges as in the case of the previously described movement in the opposite direction. In consequence the effect obtained is also the same, that is to say, the drive is disconnected, the brake is caused to take effect and the spindle is stopped.

From the foregoing description it is thought to be obvious that a winding frame constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. In a winding frame, the combination comprising a winding spindle, means for driving the said spindle, a disc clutch included in the said driving means, a second disc clutch for braking the said spindle, a shiftable member positioned between the said second clutch and the said first clutch, movement of the said shiftable member releasing one of the clutches and making the other effective, a pendulating yarn feeler within the path of the yarn, an operative connection between the said yarn feeler and the shiftable member common to the said two clutches, said connection being so constructed and arranged to provide means whereby the movement of the said shiftable member is controlled by the said yarn feeler, said means including an electro-magnetic coil located in an electric circuit, an electromagnetic core operatively engaged with the shiftable member, and a regulable resistance in the circuit including the coil, said resistance being determined by the pendulating yarn feeler.

2. In a winding frame the combination comprising a winding spindle adapted to carry a pirn on which the yarn is wound as the spindle is rotated, a driving means for said spindle including a clutch, a clutch for braking said spindle, a movable clutch member by which said clutches may be thrown on or off, respectively, dependent upon the position of said clutch member, a pendulating feeler engaged by the yarn in its passage to said pirn and movable by change in the tension of the yarn, mechanism constructed and arranged to provide means whereby said feeler will assist in the positioning of said shiftable member dependent upon the tension of the yarn, said mechanism including an electro magnetic device having a part in engagement with said movable member and rendered active to move said member by the completion of an electric circuit, a regulable resistance within said circuit having a zero position relatively corresponding with a determinate position of said pendulating feeler with ranges of resistance extending in opposite directions from said zero position, and means for completing the electric circuit through said ranges of resistance depending as the pendulating feeler turns in one direction or another from its said determinate position.

3. In a winding frame the combination comprising a winding spindle adapted to carry a pirn on which the yarn is wound as the spindle is rotated, a driving means for said spindle including a clutch, a clutch for braking said spindle, a movable clutch member by which said clutches may be thrown on or off, respectively, dependent upon the position of said clutch member, a pendulating feeler engaged by the yarn in its passage to said pirn and movable by change in the tension of the yarn, means for yieldingly controlling said feeler whereby the yarn will be tensioned thereby, and mechanism contructed and arranged to provide means whereby said feeler will assist in the positioning of said shiftable member depending upon the tension of the yarn, said mechanism including an electro magnetic device having a part in engagement with said movable member and rendered active to move said member by the completion of an electric circuit, a regulable resistance within said circuit with ranges of resistance, and means for completing the electric circuit through said ranges of resistance with lessening resistance determined by the extent of movement of said pendulating feeler.

4. In a winding frame the combination comprising a winding spindle adapted to carry a pirn on which the yarn is wound as the spindle is rotated, a driving means for said spindle including a clutch, a clutch for braking said spindle, a movable clutch member by which said clutches may be thrown on or off, respectively, dependent upon the position of said clutch member, a pendulating feeler engaged by the yarn in its passage to said pirn and movable by change in the tension of the yarn, means for yieldingly controlling said feeler whereby the yarn will be tensioned thereby, and mechanism constructed and arranged to provide means whereby said feeler will assist in the positioning of said shiftable member depending upon the tension of the yarn, said mechanism including an electro-magnetic device having a part in engagement with said movable member and rendered active to move said member by the completion of an electric circuit, a regulable resistance within said circuit with ranges of resistance, and means for completing the electric circuit through said ranges of resistance with lessening resistance dependent upon the extent of movement of said pendulating feeler in either of opposite directions from a determinate position.

5. In a winding frame the combination comprising a winding spindle, means for driving the said spindle, a disc clutch included in the said driving means, a second disc clutch for braking the said spindle, a shifting member positioned between the said second clutch and the said first clutch, movement of the said shifting member releasing one of the clutches and making the other effective, a pendulating yarn feeler within the path of the yarn, means for yieldingly controlling said feeler whereby the yarn will be tensioned thereby, an operative connection between the said yarn feeler and the shifting member common to the said two clutches, said connection being so constructed and arranged to provide means whereby the movement of the said shifting member is controlled by the said yarn feeler, said last-named means including an electro-magnetic coil located in an electric circuit, an electro-magnetic core operatively engaged with the shifting member, and a regulable resistance in the circuit including the coil, said resistance being determined by the pendulating yarn feeler.

HANS TRECKMANN.
CARL-GEORG ROSENKRANZ.